H. E. STONER.
ROLLER BEARING.
APPLICATION FILED DEC. 20, 1909.
1,100,791.  Patented June 23, 1914.
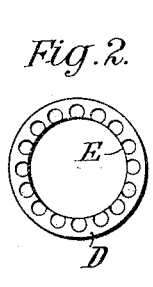
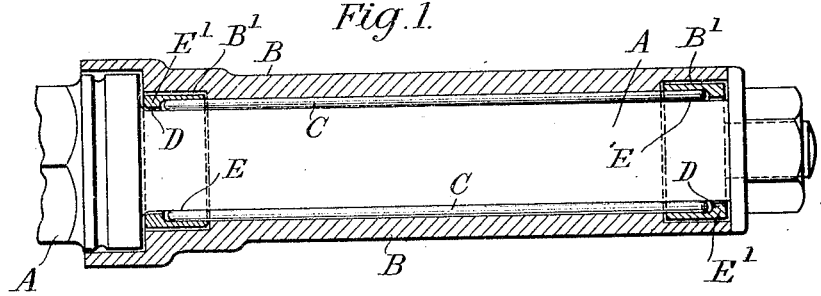
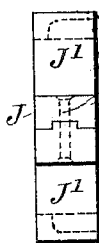
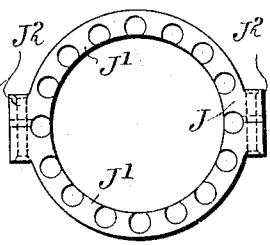
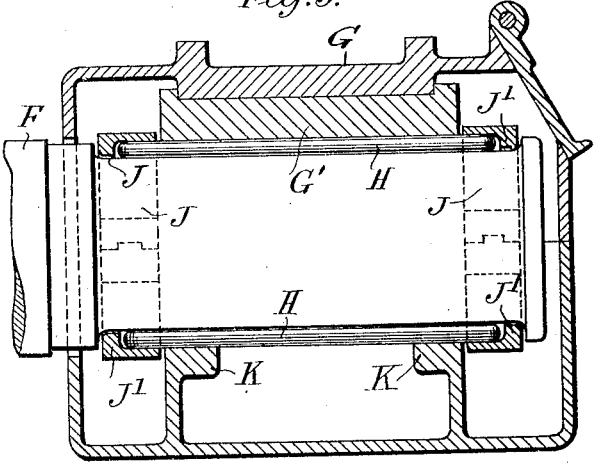
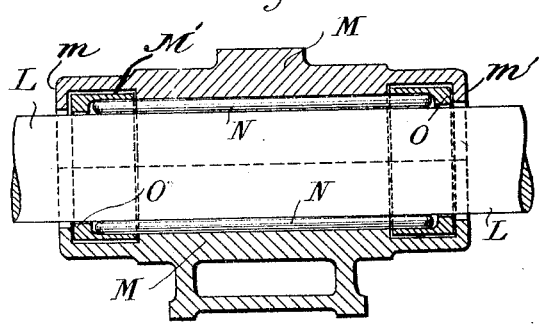
WITNESSES.  INVENTOR.

UNITED STATES PATENT OFFICE.

HENRY EVANS STONER, OF WALTON-ON-THAMES, ENGLAND.

ROLLER-BEARING.

1,100,791.  Specification of Letters Patent.  Patented June 23, 1914.

Application filed December 20, 1909. Serial No. 534,020.

*To all whom it may concern:*

Be it known that I, HENRY EVANS STONER, a citizen of the United States, and a resident of Walton-on-Thames, in the county of Surrey, England, have invented a certain new and useful Improvement in Roller-Bearings, of which the following is a specification.

This invention relates to improvements in roller bearings such for instance as those adapted for bearings of vehicles, shafting and the like.

The object of the invention is to provide improved means for separating and retaining each one of a series of rollers which are located between the axle, shaft, or spindle and the wheel box or bearing respectively and at the same time to provide means for taking the end thrust of the rollers when under side strain and so preventing the wear on the fixed collars of the shaft or bearing due to the roller ends coming into contact with such collars.

The invention also provides for an unbroken or uninterrupted bearing surface for the rollers on the axle spindle or shaft as well as in the bearing, casing, or sleeve surrounding the same.

The class of bearing is that in which rollers of uniform diameter and considerable length are carried at each end by grooved retaining devices which hold said rollers for some distance of their length the grooves having closed ends to enable the retainers to take the end thrusts of the rollers. Heretofore such retainers have been connected by bolts so as to form a self contained cage in which the rollers are held.

According to this invention the rollers are provided with retainers—one at each end, independent except for the rollers which they mutually hold and which retainers seat in recesses of the carrying box, hub, sleeve, or block or abut against the ends or shoulders of the actual bearing surfaces of the same so that they are by this means kept apart or located in addition to the separation they naturally obtain by the rollers, whereby the strains set up in the usual self contained bearings (where the retainers are connected by bolts) are avoided, the retainers being quite loose to take up the thrusts of the rollers and to transmit them to the collars or other fixed parts of the shaft.

The retainers have the usual slots or grooves which are preferably cut longitudinally through only a portion of their thickness so as to enable them to take the end thrust; and are also adapted to engage with the ends of the plain rollers for some distance along their length. They are further cut from the interior only so that the rollers project only beyond the inside face the outer face being untouched.

In the accompanying drawings:—Figure 1 is a central longitudinal section of the bearing as applied to the axle of a road vehicle; Fig. 2 is an end elevation of one of the retainers for the same; Fig. 3 is a central longitudinal section of the bearing as applied to the axle of a railway vehicle; Fig. 4 is an end elevation of one of the retainers for the same; Fig. 5 is a side elevation of such retainer; Fig. 6 is a central longitudinal section of the bearing as applied to line shafting.

In Fig. 1, A is the axle, and B the box or sleeve of the wheel boss. C are the rollers which are separated and retained in their relative positions by the retainers D, one at each end. Each retainer is in the form shown in this figure seated in a recess B' in the sleeve B outside the effective bearing surface of the rollers so that it abuts against a shoulder formed by said recess at the end of the actual bearing surface of the sleeve B and is substantially a bush with a series of grooves E cut from the inside some distance into it in depth radially and a part of its length longitudinally to form a shoulder or closed end E' to take the end thrust of the rollers. The location of the grooves in the bush is such that the rollers project slightly beyond the inner surface of the retainer and bear on the axle, shaft, or spindle while the retainer itself is clear of the axle, shaft, or spindle. The retainers may be made in one piece or divided into two or more parts which may be secured together if desired by screws, rivets, or other suitable fastenings as may be most convenient in any particular application of the invention. The rollers are a free fit both in diameter and longitudinally in the grooves of the retainers and the retainers are quite free of both the axle and the sleeve or casing, in all directions, so that there is little or no friction between any of these parts. The use of two retainers insures the bearing running firmly and fairly thus keeping the rollers parallel with each other and as the ends of the rollers do not project through the retainers but abut against the closed ends such roller ends do not come into contact with the fixed collars on the axle and any wear due to the end thrust of the rollers is taken by the retainers which can readily be renewed.

The retainers and rollers are held in their position in the bearing longitudinally by the fixed shoulder of the axle at the inner end and by a nut and washer, collar, nut or other suitable fastening at the outer end. If it is desired however to prevent the rollers and retainers from falling apart when the wheel is withdrawn from the axle, means may be provided to enable the wheel sleeve rollers and retainers to be withdrawn from the axle together. The sleeve or casing can be made in one piece or a number of pieces as may best suit the convenience of any particular application. In the form shown in Fig. 1 it will be seen that no alteration is required in existing axles to enable them to take this bearing.

In Fig. 3, F is the axle, G the axle-box corresponding to the box or sleeve of Fig. 1, H the rollers, J the retainers, which in this case are made in two parts $J^1$ $J^1$ (see Figs. 4 and 5) connected by rivets $J^2$ passing through flanges of each part or other means of connecting the parts may be employed. The top of the axle box G is fitted with a bearing block or shoe $G^1$ the inner surface of which bears upon the rollers and transmits the weight to them and when below the center the rollers are kept in close contact with the axle by keep pieces K which may form a part of the bottom of the axle box. These keep pieces also allow for lubrication of the bearing by the usual pad or other suitable means. The retainers in this instance have their inner sides or ends arranged to abut against the ends or shoulders of the bearing block $G^1$, and the rollers and retainers are held in their position in the bearing longitudinally by a shoulder on the axle at the inner end and by a collar or other suitable device at the outer end, substantially as described with reference to the construction shown in Fig. 1.

In Fig. 6, L is the shaft, M the bearing block corresponding to the box or sleeve of Fig. 1, N the rollers, and O the retainers, which may be whole or in two or more pieces suitably connected as the circumstances of the case require. The letter $M^1$ denotes annular recesses in the interior of the bearing block M, at opposite ends thereof, adapted to receive the retainers and provide shoulders or abutments $m$ and $m^1$ between which the retainers are confined. The bearing block may be made in separable parts to permit the retainers to be fitted in said recesses, such parts being bolted or otherwise secured together.

In the application of my invention illustrated in Fig. 6 of the drawings the retainers are fitted in the annular recesses on the interior of the axle-box or bearing-block so as to abut the shoulders at opposite ends of said recesses, and are thereby held against axial movement.

As will be understood from the illustrated embodiments of my invention, the axle-box may rotate on a fixed shaft or spindle, as shown in Fig. 1, or the axle-box may be held stationary while the axle or shaft is adapted to rotate, as shown in Figs. 3 and 6; hence the term "axle" as used in the appended claims is intended to include either a fixed or rotating member.

I am aware that it has been proposed to employ retaining devices for rollers which are unconnected and can take up end thrust but not as I form them as described nor in connection with long rollers of uniform diameter such as can conveniently be cut from wire rods and which owing to their unreduced diameter can transmit comparatively heavy end thrusts as their end bearing surfaces are of a suitable diameter for their requirements.

In the claims hereinafter the term "box" must be interpreted to include any of the equivalent parts hereinbefore described and the term "axle" to include a shaft.

What I claim is:—

1. The combination with an axle and a box having at each end an annular recess provided with a shoulder, of a series of rollers of uniform diameter in contact with both axle and box, and two independent retainers, one at each end of the rollers and each comprising a bush with a series of grooves cut from the inside some distance into it in depth radially to allow the rollers to contact with the axle and having a shoulder at the end; said retainers fitting said annular recesses and held by the shoulders thereof against axial movement, and the end shoulders of said retainers adapted to take the end thrust of said rollers, said grooves being adapted to receive the rollers to their full diameter.

2. A roller bearing comprising an axle and an axle box having oppositely disposed shoulders or abutments at each end of the box, a series of rollers of uniform diameter arranged between said axle and box, and an independent retainer at each end of said axle box confined between oppositely disposed abutments or shoulders, each retainer comprising a bush having a series of spaced grooves on its inner side extending some distance into it in depth radially and having its outer end closed to form an abutment for the ends of the rollers, the retainers being located outside of the effective bearing-surface of the rollers on the axle-box and adapted to take the end thrust of the rollers.

In testimony whereof I have set my hand in the presence of two subscribing witnesses.

HENRY EVANS STONER.

Witnesses:
 ALEX. H. MATHER,
 ARTHUR W. WALKER.